United States Patent
Su et al.

(10) Patent No.: US 12,010,655 B2
(45) Date of Patent: Jun. 11, 2024

(54) CHANNEL STATE INFORMATION REPORTING METHOD AND DEVICE, TERMINAL AND NETWORK SIDE DEVICE

(71) Applicant: DATANG MOBILE COMMUNICATIONS EQUIPMENT CO., LTD., Beijing (CN)

(72) Inventors: Xin Su, Beijing (CN); Hui Li, Beijing (CN); Qiubin Gao, Beijing (CN); Runhua Chen, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 579 days.

(21) Appl. No.: 17/280,811

(22) PCT Filed: Sep. 26, 2019

(86) PCT No.: PCT/CN2019/108142
§ 371 (c)(1),
(2) Date: Mar. 26, 2021

(87) PCT Pub. No.: WO2020/063743
PCT Pub. Date: Apr. 2, 2020

(65) Prior Publication Data
US 2022/0015064 A1    Jan. 13, 2022

(30) Foreign Application Priority Data

Sep. 27, 2018 (CN) .......................... 201811133688.5

(51) Int. Cl.
*H04W 72/02* (2009.01)
*H04W 24/10* (2009.01)
(Continued)

(52) U.S. Cl.
CPC .......... *H04W 72/02* (2013.01); *H04W 24/10* (2013.01); *H04W 72/542* (2023.01); *H04W 72/563* (2023.01)

(58) Field of Classification Search
CPC ... H04W 28/04; H04W 72/04; H04W 72/042; H04W 88/08; H04W 72/02;
(Continued)

(56) References Cited

U.S. PATENT DOCUMENTS

2009/0089437 A1    4/2009 Polozoff
2011/0170435 A1*   7/2011 Kim ...................... H04L 1/0693
                                                      370/252
(Continued)

FOREIGN PATENT DOCUMENTS

CN    102437986 A    5/2012
CN    103503330 A    1/2014
(Continued)

OTHER PUBLICATIONS

3GPP TSG RAN WG1 Meeting #89, Hangzhou, China, May 15-19, 2017, R1-1707981, Agenda item: 7.1.2.4.7, Source: Samsung, Huawei, HiSilicon, Title: Remaining issues on NR CSI-RS. (Year: 2017).*
(Continued)

*Primary Examiner* — Peter G Solinsky
*Assistant Examiner* — Sanjay K Dewan
(74) *Attorney, Agent, or Firm* — Ladas & Parry, LLP

(57) ABSTRACT

A CSI reporting method, a CSI reporting device, a terminal and a network side device are provided. The CSI reporting method includes: acquiring a resource set configured by a network side device, the resource set including a plurality of measurement resources; measuring a downlink reference signal for a plurality of transmission nodes in accordance with the plurality of measurement resources, to determine a target CSI-RS port set for CSI measurement; and performing
(Continued)

S110 — acquiring a resource set configured by a network side device, the resource set including a plurality of measurement resources S120 — measuring a downlink reference signal for a plurality of transmission nodes in accordance with the plurality of measurement resources, to determine a target CSI-RS port set for CSI measurement S130 — performing calculation in accordance with the target CSI-RS port set to acquire to-be-reported CS calculation in accordance with the target CSI-RS port set to acquire to-be-reported CSI.

19 Claims, 2 Drawing Sheets

(51) Int. Cl.
*H04W 72/06* (2009.01)
*H04W 72/08* (2009.01)
*H04W 72/542* (2023.01)
*H04W 72/563* (2023.01)

(58) Field of Classification Search
CPC . H04W 72/542; H04W 72/563; H04W 24/10; H04W 72/06; H04W 72/085; H04L 5/0007
USPC .......................................................... 370/329
See application file for complete search history.

(56) References Cited

U.S. PATENT DOCUMENTS

| | | | |
|---|---|---|---|
| 2012/0207047 A1* | 8/2012 | Liao | H04B 7/0645 370/252 |
| 2012/0281567 A1 | 11/2012 | Gao et al. | |
| 2013/0028225 A1* | 1/2013 | Ko | H04L 5/0057 370/329 |
| 2013/0083681 A1* | 4/2013 | Ebrahimi Tazeh Mahalleh | H04B 7/0626 370/252 |
| 2013/0322376 A1 | 12/2013 | Marinier et al. | |
| 2016/0156401 A1 | 6/2016 | Onggosanusi et al. | |
| 2019/0089437 A1 | 3/2019 | Chen et al. | |
| 2020/0007205 A1 | 1/2020 | Park et al. | |

FOREIGN PATENT DOCUMENTS

| | | | | |
|---|---|---|---|---|
| CN | 104584450 A | 4/2015 | | |
| CN | 107005293 A | 8/2017 | | |
| CN | 107204794 A | 9/2017 | | |
| CN | 108347316 A | 7/2018 | | |
| JP | 2015-523013 A | 8/2015 | | |
| WO | 2016089124 A1 | 6/2016 | | |
| WO | WO 2016/089124 A1 * | 6/2016 | ............... | H04B 7/04 |
| WO | 2016181331 A1 | 11/2016 | | |
| WO | 2018143662 A1 | 8/2018 | | |

OTHER PUBLICATIONS

3GPP TSG-RAN WG1 #90bis, Prague, Czech Republic, Oct. 9-13, 2017, R1-1718431, Source: Ericsson, Title: On CSI measurement, Agenda item: 7.2.2.1. (Year: 2017).*
Extended European Search Report from corresponding EP app. No. 19864648.1, dated Oct. 21, 2021, all pages.
Samsung, Huawei, HiSilicon, "Remaining Issues on NR CSI-RS", R1-1707981, 3GPP TSG RAN WG1 Meeting #89, Hangzhou, China, May 15-19, 2017, all pages.
Ericsson, "On CSI measurement", R1-1718431, 3GPP TSG-RAN WG1 #90bis, Prague, Czech Republic, Oct. 9-13, 2017, all pages.
First Japanese Office Action for Japanese Patent Application 2021-517325 dated May 24, 2022, and its English Translation provided by Global Dossier.
"On remaining details of CSI measurement," 3GPP TSG-RAN WG1 #91, R1-1720733, Reno, USA, Nov. 27-Dec. 1, 2017, Source: Ericsson, Agenda Item: 7.2.2.1, all pages.
"Details on the unified CSI feedback framework", R1-1612348, 3GPP TSG-RAN WG1 #87, Reno, Nevada, Nov. 14-18, 2016, all pages.
"Issues on CSI reporting", R1-1808749, 3GPP TSG RAN WG1 Meeting #94, Gothenburg, Sweden, Aug. 20-24, 2018, all pages.
First Office Action and Search Report from CN app. No. 201811133688. 5, dated Oct. 9, 2020, with English translation from Global Dossier, all pages.
International Search Report from PCT/CN2019/108142, dated Dec. 27, 2019, with English translation from WIPO, all pages.
Written Opinion of the International Searching Authority from PCT/CN2019/108142, dated Dec. 27, 2019, with English translation from WIPO, all pages.
International Preliminary Report on Patentability from PCT/CN2019/108142, dated Mar. 23, 2021, with English translation from WIPO, all pages.

* cited by examiner

CHANNEL STATE INFORMATION REPORTING METHOD AND DEVICE, TERMINAL AND NETWORK SIDE DEVICE

CROSS-REFERENCE TO RELATED APPLICATIONS

The present application is the U.S. national phase of PCT Application No. PCT/CN2019/108142 filed on Sep. 26, 2019, which claims a priority of the Chinese patent application No. 201811133688.5 filed in China on Sep. 27, 2018, the disclosures of which are incorporated herein by reference in their entireties.

TECHNICAL FIELD

The present disclosure relates to the field of wireless communication technology, in particular to a Channel State Information (CSI) reporting method, a CSI reporting device, a terminal, and a network side device.

BACKGROUND

The CSI feedback determines Multiple-Input Multiple-Output (MIMO) transmission performance, so it plays a very important role in the entire MIMO design. In a Long Term Evolution (LTE) system, a variety of different feedback types have been defined in different standardized versions, so as to support the CSI feedback in different MIMO transmission schemes.

In order to improve the coverage at a cell edge and provide a more balanced service quality in a service area, Coordinated Multiple Points Transmission (CoMP) is an important technical measure in a New Radio (NR) system. Considering deployment conditions, frequency bands and antenna patterns of the NR system, the use of the CoMP in the NR system has more obvious practical significance. At a high frequency band, along with an increase in an integration level of an active antenna device, it is more inclined to use a modularized active antenna array. An antenna array of each Transmission and Reception Point (TRP) may be divided into several antenna sub-arrays (or panels) independent of each other, so a pattern and the quantity of ports of the entire panel may be flexibly adjusted in accordance with a deployment scenario as well as a service requirement.

However, in the related art, a CSI feedback mechanism is mainly provided with respect to single-point transmission and multiple-point coherent transmission, and it cannot support multiple-point incoherent transmission in a better manner.

SUMMARY

An object of the present disclosure is to provide a CSI reporting method, a CSI reporting device, a terminal and a network side device, so as to report the CSI in a radio network during multiple-point incoherent transmission.

In one aspect, the present disclosure provides in some embodiments a CSI reporting method for a terminal, including:
acquiring a resource set configured by a network side device, the resource set including a plurality of measurement resources;
measuring a downlink reference signal for a plurality of transmission nodes in accordance with the plurality of measurement resources, to determine a target Channel State Information-Reference Signal (CSI-RS) port set for CSI measurement; and
performing calculation in accordance with the target CSI-RS port set to acquire to-be-reported CSI Optionally, the CSI reporting method further includes:
acquiring a correspondence between CSI-RS port sets and different rank values supported by the transmission nodes, the correspondence being configured by the network side device in accordance with the plurality of measurement resources;
wherein the measuring the downlink reference signal for the plurality of transmission nodes in accordance with the plurality of measurement resources to determine the target CSI-RS port set for the CSI measurement includes: selecting, from the correspondence in accordance with channel measurement data acquired through measuring the downlink reference signal, one of the rank values as a target rank value, and determining a CSI-RS port set corresponding to the target rank value as the target CSI-RS port set.

Optionally, in the CSI reporting method, the measuring the downlink reference signal for the plurality of transmission nodes in accordance with the plurality of measurement resources to determine the target CSI-RS port set for the CSI measurement includes: determining, by the terminal in accordance with the channel measurement data acquired through measuring the downlink reference signal, that CSI-RS ports corresponding to at least a part of the plurality of measurement resources form the target CSI-RS port set.

Optionally, in the CSI reporting method, there is a plurality of resource sets and each of the resource sets includes at least one measurement resource, or there is one resource set including a plurality of measurement resources.

Optionally, in the CSI reporting method, there is a plurality of resource sets, each of the resource sets includes at least one measurement resource, the measurement resources in the plurality of resource sets form a plurality of measurement resource combinations, and the measurement resources in each of the measurement resource combinations are located in different resource sets;
wherein in the acquired correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one of the measurement resource combinations.

Optionally, in the CSI reporting method, there is one resource set including a plurality of measurement resources, and at least a part of the plurality of measurement resources forms a measurement resource combination;
wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination.

Optionally, in the CSI reporting method, there is a plurality of resource sets and each of the resource sets includes at least one measurement resource; or there is one resource set including a plurality of measurement resources;
wherein in the correspondences, one measurement resource corresponds to one correspondence; and in the correspondences, each of different rank values corresponds to a respective one of the CSI-RS port sets, and each of the CSI-RS ports in the CSI-RS port set belongs to a port corresponding to a same measurement resource.

Optionally, in the CSI reporting method, the selecting from the correspondence one of the rank values as the target rank value includes:

selecting, from the correspondence corresponding to one measurement resource combination, one rank value as the target rank value.

Optionally, in the CSI reporting method, when there is a plurality of resource sets, the selecting from the correspondence one of the rank values as the target rank value includes:

determining at least one target measurement resource in each of the resource sets;

selecting, from the correspondence corresponding to each target measurement resource, a respective one rank value as the target rank value.

Optionally, in the CSI reporting method, when there is one resource set, the selecting from the correspondence one of the rank values as the target rank value includes:

determining at least one measurement resource in the plurality of measurement resources as a target measurement resource;

determining, from the correspondence corresponding to the target measurement resource, one rank value as the target rank value.

Optionally, in the CSI reporting method, in the step of performing calculation to acquire the to-be-reported CSI, the CSI includes a Channel Quality Indicator (CQI);

wherein the CSI reporting method further includes:

reporting the CQI for each codeword and the target rank value.

Optionally, in the CSI reporting method, in the step of performing calculation to acquire the to-be-reported CSI, the CSI includes a CQI;

wherein the CSI reporting method further includes:

reporting the target rank value corresponding to each target measurement resource and the CQI for each codeword.

Optionally, the CSI reporting method further includes:

reporting an identifier of the target measurement resource and/or an identifier of the resource set to which the target measurement resource belongs.

Optionally, in the CSI reporting method, in the step of performing calculation to acquire the to-be-reported CSI, the CSI includes a CQI;

wherein the CSI reporting method further includes:

reporting the target rank value corresponding to each target measurement resource and the CQI for each codeword.

Optionally, the CSI reporting method further includes:

reporting an identifier of the target measurement resource.

Optionally, in the CSI reporting method, when there is a plurality of resource sets, the determining, by the terminal in accordance with the channel measurement data acquired through measuring the downlink reference signal, that CSI-RS ports corresponding to at least a part of the measurement resources in the resource set form the target CSI-RS port set includes:

determining a target measurement resource in each of the resource sets and a CSI-RS port set corresponding to the target measurement resource in accordance with the channel measurement data;

determining a CSI-RS port set corresponding to the measurement resource as the target CSI-RS port set.

Optionally, in the CSI reporting method, in the step of performing calculation to acquire the to-be-reported CSI, the CSI includes a CQI;

wherein the CSI reporting method further includes:

reporting the target CSI-RS port set and the CQI for each codeword.

Optionally, the CSI reporting method further includes:

reporting an identifier of the target measurement resource and/or an identifier of the resource set to which the target measurement resource belongs.

Optionally, in the CSI reporting method, when there is one resource set, the determining, by the terminal in accordance with the channel measurement data acquired through measuring the downlink reference signal, that CSI-RS ports corresponding to at least a part of the measurement resources in the resource set form the target CSI-RS port set includes:

determining a target measurement resource in the plurality of measurement resources in the resource set and a CSI-RS port set corresponding to the target measurement resource in accordance with the channel measurement data;

determining the CSI-RS port set corresponding to the target measurement resource as the target CSI-RS port set.

Optionally, in the CSI reporting method, in the step of performing calculation to acquire the to-be-reported CSI, the CSI includes a CQI;

wherein the CSI reporting method further includes:

reporting the target CSI-RS port set and the CQI for each codeword.

Optionally, the CSI reporting method further includes:

reporting the identifier of the target measurement resource.

In another aspect, the present disclosure provides in some embodiments a CSI reporting method for a network side device, including:

configuring a resource set for a terminal, the resource set including a plurality of measurement resources;

transmitting configuration information of the resource set to the terminal.

Optionally, the CSI reporting method further includes:

configuring a correspondence between CSI-RS port sets and different rank values supported by a transmission node in accordance with the plurality of measurement resources;

transmitting the correspondence to the terminal.

Optionally, in the CSI reporting method, there is a plurality of resource sets and each of the resource sets includes at least one measurement resource; or there is one resource set including a plurality of measurement resources.

Optionally, in the CSI reporting method, there is a plurality of resource sets, each of the resource sets includes at least one measurement resource, the measurement resources in the plurality of resource sets form a plurality of measurement resource combinations, and the measurement resources in each of the measurement resource combinations are located in different resource sets;

wherein in the correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one measurement resource combination.

Optionally, in the CSI reporting method, there is one resource set including a plurality of measurement resources, and at least a part of the plurality of measurement resources forms a measurement resource combination;

wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination.

Optionally, in the CSI reporting method, there is a plurality of resource sets and each of the resource sets includes at least one measurement resource; or there is one resource set including a plurality of measurement resources;

wherein in the correspondences, one measurement resource corresponds to one correspondence; and in the correspondences, each of different rank values corresponds to a respective one of the CSI-RS port sets, and each of the CSI-RS ports in the CSI-RS port set belongs to a port corresponding to one measurement resource.

In yet another aspect, the present disclosure provides in some embodiments a terminal, including a memory, a processor, and a program stored in the memory and executed by the processor, wherein the processor is configured to execute the program to:

acquire a resource set configured by a network side device, the resource set including a plurality of measurement resources;

measure a downlink reference signal for a plurality of transmission nodes in accordance with the plurality of measurement resources, to determine a target CSI-RS port set for CSI measurement; and perform calculation in accordance with the target CSI-RS port set to acquire to-be-reported CSI.

Optionally, in the terminal, the processor is further configured to:

acquire a correspondence between CSI-RS port sets and different rank values supported by the transmission nodes, the correspondence being configured by the network device in accordance with the plurality of measurement resources;

wherein the measuring the downlink reference signal for the plurality of transmission nodes in accordance with the plurality of measurement resources to determine the target CSI-RS port set for the CSI measurement includes: selecting, from the correspondence in accordance with channel measurement data acquired through measuring the downlink reference signal, one of the rank values as a target rank value, and determining a CSI-RS port set corresponding to the target rank value as the target CSI-RS port set.

Optionally, in the terminal, when the processor measures the downlink reference signal for the plurality of transmission nodes in accordance with the plurality of measurement resources to determine the target CSI-RS port set for the CSI measurement, the terminal is configured to determine, in accordance with the channel measurement data acquired through measuring the downlink reference signal, that CSI-RS ports corresponding to at least a part of the plurality of measurement resources form the target CSI-RS port set.

Optionally, in the terminal, there is a plurality of resource sets and each of the resource sets includes at least one measurement resource, or there is one resource set including a plurality of measurement resources.

Optionally, in the terminal, there is a plurality of resource sets, each of the resource sets includes at least one measurement resource, the measurement resources in the plurality of resource sets form a plurality of measurement resource combinations, and the measurement resources in each of the measurement resource combinations are located in different resource sets;

wherein in the acquired correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one of the measurement resource combinations.

Optionally, in the terminal, there is one resource set including a plurality of measurement resources, and at least a part of the plurality of measurement resources forms a measurement resource combination;

wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination.

Optionally, in the terminal, there is a plurality of resource sets and each of the resource sets includes at least one measurement resource; or there is one resource set including a plurality of measurement resources;

wherein in the correspondences, one measurement resource corresponds to one correspondence; and in the correspondences, each of different rank values corresponds to a respective one of the CSI-RS port sets, and each of the CSI-RS ports in the CSI-RS port set belongs to a port corresponding to a same measurement resource.

Optionally, in the terminal, when selecting from the correspondence one of the rank values as the target rank value, the processor is further configured to select, from the correspondence corresponding to one measurement resource combination, one rank value as the target rank value.

Optionally, in the terminal, when there is a plurality of resource sets and when selecting from the correspondence one of the rank values as the target rank value, the processor is further configured to:

determine at least one target measurement resource in each of the resource sets;

select, from the correspondence corresponding to each target measurement resource, a respective one rank value as the target rank value.

Optionally, in the terminal, when there is one resource set and when selecting from the correspondence one of the rank values as the target rank value, the processor is further configured to:

determine at least one measurement resource in the plurality of measurement resources as a target measurement resource;

determine, from the correspondence corresponding to the target measurement resource, one rank value as the target rank value.

Optionally, in the terminal, in the step that the processor performs calculation to acquire the to-be-reported CSI, the CSI includes a CQI;

wherein the processor is further configured to:
report the CQI for each codeword and the target rank value.

Optionally, in the terminal, in the step that the processor performs calculation to acquire the to-be-reported CSI, the CSI includes a CQI;
wherein the processor is further configured to:
report the target rank value corresponding to each target measurement resource and the CQI for each codeword.

Optionally, in the terminal, the processor is further configured to:
report an identifier of the target measurement resource and/or an identifier of the resource set to which the target measurement resource belongs.

Optionally, in the terminal, in the step that the processor performs calculation to acquire the to-be-reported CSI, the CSI includes a CQI;
wherein the processor is further configured to:
report the target rank value corresponding to each target measurement resource and the CQI for each codeword.

Optionally, in the terminal, the processor is further configured to:
report an identifier of the target measurement resource.

Optionally, in the terminal, when there is a plurality of resource sets, and when determining, in accordance with the channel measurement data acquired through measuring the downlink reference signal, that CSI-RS ports corresponding to at least a part of the measurement resources in the resource set form the target CSI-RS port set, the terminal is further configured to:
determine a target measurement resource in each of the resource sets and a CSI-RS port set corresponding to the target measurement resource in accordance with the channel measurement data;
determine a CSI-RS port set corresponding to the measurement resource as the target CSI-RS port set.

Optionally, in the terminal, when the processor performs calculation to acquire the to-be-reported CSI, the CSI includes a CQI;
wherein the processor is further configured to:
report the target CSI-RS port set and the CQI for each codeword.

Optionally, in the terminal, the processor is further configured to:
report an identifier of the target measurement resource and/or an identifier of the resource set to which the target measurement resource belongs.

Optionally, in the terminal, when there is one resource set, and when determining, in accordance with the channel measurement data acquired through measuring the downlink reference signal, that CSI-RS ports corresponding to at least a part of the measurement resources in the resource set form the target CSI-RS port set, the terminal is further configured to:
determine a target measurement resource in the plurality of measurement resources in the resource set and a CSI-RS port set corresponding to the target measurement resource in accordance with the channel measurement data;
determine the CSI-RS port set corresponding to the target measurement resource as the target CSI-RS port set.

Optionally, in the terminal, in the step that the processor performs calculation to acquire the to-be-reported CSI, the CSI includes a CQI;
wherein the processor is further configured to:
report the target CSI-RS port set and the CQI for each codeword.

Optionally, in the terminal, the processor is further configured to:
report the identifier of the target measurement resource.

In still yet another aspect, the present disclosure provides in some embodiments a network side device, including a memory, a processor, and a program stored in the memory and capable of being executed by the processor, wherein the processor is configured to execute the program to:
configure a resource set for a terminal, the resource set including a plurality of measurement resources;
transmit configuration information of the resource set to the terminal.

Optionally, in the network side device, the processor is further configured to:
configure a correspondence between CSI-RS port sets and different rank values supported by a transmission node in accordance with the plurality of measurement resources;
transmit the correspondence to the terminal.

Optionally, in the network side device, there is a plurality of resource sets and each of the resource sets includes at least one measurement resource; or there is one resource set including a plurality of measurement resources.

Optionally, in the network side device, there is a plurality of resource sets, each of the resource sets includes at least one measurement resource, the measurement resources in the plurality of resource sets form a plurality of measurement resource combinations, and the measurement resources in each of the measurement resource combinations are located in different resource sets;
wherein in the correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one measurement resource combination.

Optionally, in the network side device, there is one resource set including a plurality of measurement resources, and at least a part of the plurality of measurement resources forms a measurement resource combination;
wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination.

Optionally, in the network side device, there is a plurality of resource sets and each of the resource sets includes at least one measurement resource; or there is one resource set including a plurality of measurement resources;
wherein in the correspondences, one measurement resource corresponds to one correspondence; and
in the correspondences, each of different rank values corresponds to a respective one of the CSI-RS port sets, and each of the CSI-RS ports in the CSI-RS port set belongs to a port corresponding to one measurement resource.

In still yet another aspect, the present disclosure provides in some embodiments a CSI reporting device for a terminal, including:
an acquisition module configured to acquire a resource set configured by a network side device, the resource set including a plurality of measurement resources;
a processing module configured to measure a downlink reference signal for a plurality of transmission nodes in accordance with the plurality of measurement resources, to determine a target CSI-RS port set for CSI measurement;

a calculation module configured to perform calculation in accordance with the target CSI-RS port set to acquire to-be-reported CSI.

In still yet another aspect, the present disclosure provides in some embodiments a CSI reporting device for a network side device, including:

a configuration module configured to configure a resource set for a terminal, the resource set including a plurality of measurement resources;

a transmission module configured to transmit configuration information of the resource set to the terminal.

In still yet another aspect, the present disclosure provides in some embodiments a computer-readable storage medium storing therein a program, wherein the program is configured to be executed by a processor, to implement the steps of the above-mentioned CSI reporting method.

The above technical solutions of the present disclosure at least has the following beneficial effect:

according to the CSI reporting method in the embodiments of the present disclosure, the resource set including a plurality of measurement resources may be configured by the network side device, and the downlink reference signal for the plurality of transmission nodes may be measured so as to determine the CSI-RS port sets corresponding to different transmission nodes. As a result, it is able to perform calculation to obtain the CSI transmitted by the transmission nodes in an incoherent manner, thereby to report the CSI in a radio network during the multiple-point incoherent transmission.

DETAILED DESCRIPTION

Figure 1:
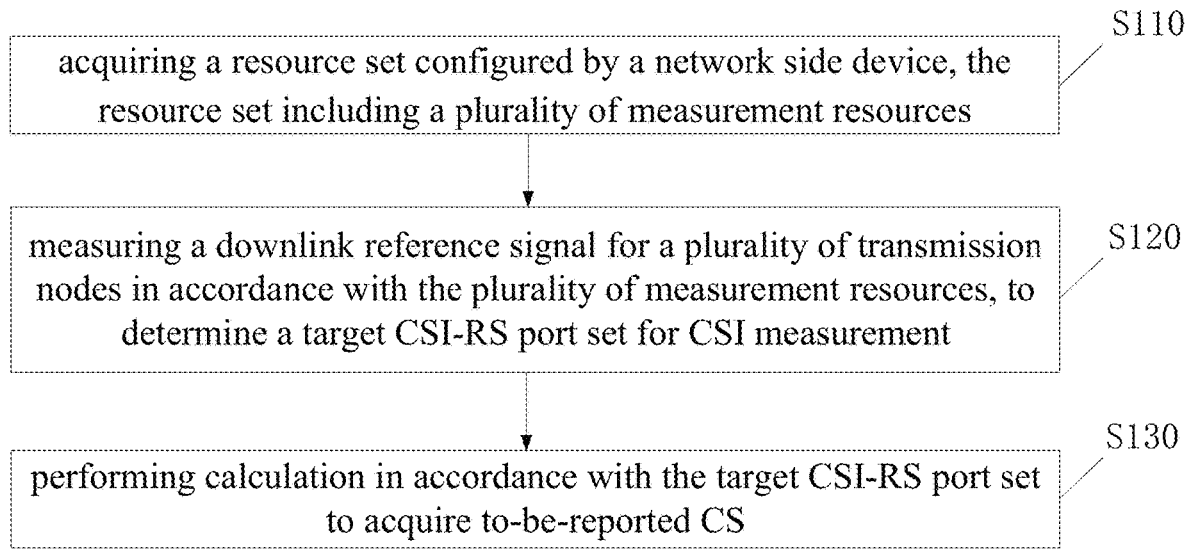
FIG. 1 is a flow chart of an first implementation of a CSI reporting method according to an embodiment of the present disclosure.

In order to make the technical problems to be solved by the present disclosure, the technical solutions and the advantages of the present disclosure more apparent, the present disclosure will be described hereinafter in details in conjunction with the drawings and embodiments.

The embodiments of the present disclosure provide a method for reporting CSI. In order to clearly illustrate the technical solution of the method for reporting CSI in the present disclosure, at first, related application scenarios will be described hereinafter.

In a New Radio (NR) system, the CSI may include a CQI, a Precoding Matrix Indicator (PMI), a CSI-RS Resource Indicator (CRI), a Synchronization Signal/Physical Broadcast Channel (SS/PBCH) Block Resource Indicator (SSBRI), a Layer Indication (LI), a Rank Indicator (RI), and a Layer-1 Reference Signal Receiving Power (L1-RSRP). The SSBRI, LI and L1-RSRP are each a newly-added feedback on the basis of a CSI feedback for an LTE system. LI is used to indicate a strongest column in the PMI for mapping a Phase Tracking-Reference Signal (PT-RS). The SSBRI and L1-RSRP are used for beam management, with one of them being used to indicate a beam index and the other being used to indicate a beam intensity.

In a 5G system, in order to prevent the introduction of various feedback types or feedback sub-types, the design of a unified CSI feedback framework is to be considered. In this system design, CSI measurement is decoupled from a CSI feedback mode, and measurement resources and measurement operations are separated from a specific reporting operation, so as to support the application of different MIMO transmission modes in various scenarios and at various frequency bands in a more flexible manner. Based on the above principle of decoupling the CSI measurement from the CSI feedback mode, the system will configure N reporting settings for reporting different measurement results (N≥1) and M CSI-RS measurement resource settings (M≥1) for each UE. Each reporting setting is associated with one or more resource settings, and it is used for channel and interference measurement as well as the reporting of the measurement results. In this way, it is able to flexibly set different measurement sets and reporting combinations in accordance with different terminal requirements and application scenarios.

The reporting setting includes the following parameter configurations: CSI feedback parameter (report quantity), codebook configuration, time-domain behavior of the CSI feedback, frequency-domain granularity of PMI and CQI, and measurement constraint configuration. The CSI feedback parameter is used to indicate the UE to perform beam management-related feedback or CSI acquisition-related feedback. Each resource setting includes number S of resource sets (S≥1), and each resource set includes number Ks of CSI-RS resources (Ks≥1).

Based on a mapping relationship from transmission signal streams to TRPs/panels, a CoMP technology may approximately include two types, i.e., coherent transmission and incoherent transmission. During the coherent transmission, each data layer may be mapped to a plurality of TRPs/panels through a weighted vector. During the incoherent transmission, each data stream is merely mapped to a part of the TRPs/panels. In the coherent transmission, synchronization between the transmission nodes and a backhaul transmission capability is demanded in a higher manner, so the coherent transmission is relatively more sensitive to many non-ideal factors in an actual deployment condition. Relatively speaking, the incoherent transmission is less susceptible to these factors, so it is a favorable scheme in the NR multiple-point transmission technology.

In the related art, a CSI feedback mechanism is mainly provided with respect to single-point transmission and multiple-point coherent transmission, and it is impossible to achieve the multiple-point incoherent transmission. Embodiments of the present disclosure provide a CSI reporting method, where a resource set including a plurality of measurement resources is configured by a network side device, and a downlink reference signal for a plurality of transmission nodes is measured, so as to determine CSI-RS port sets corresponding to different transmission nodes and perform calculation to obtain the CSI transmitted by the plurality of transmission node in an incoherent manner.

As shown in FIG. 1, the present disclosure provides in some embodiments a CSI reporting method for a terminal, which includes:

S110 of acquiring a resource set configured by a network side device, the resource set including a plurality of measurement resources;

S120 of measuring a downlink reference signal for a plurality of transmission nodes in accordance with the plurality of measurement resources, to determine a target CSI-RS port set for CSI measurement;

S130 of performing calculation in accordance with the target CSI-RS port set to acquire to-be-reported CSI.

Further, in the embodiments of the present disclosure, the target CSI-RS port set for the CSI measurement may be determined in accordance with a correspondence between CSI-RS port sets configured by the network side device and different rank values supported by the transmission nodes, or the CSI-RS port set for the CSI measurement may be selected by the terminal itself in accordance with the resource set configured by the network side device.

Based on the above, in a possible embodiment of the present disclosure, the CSI reporting method may further include:

acquiring a correspondence between CSI-RS port sets and different rank values supported by the transmission nodes, the correspondence being configured by the network side device in accordance with the plurality of measurement resources;

in the step S120, the measuring the downlink reference signal for the plurality of transmission nodes in accordance with the plurality of measurement resources to determine the target CSI-RS port set for the CSI measurement includes:

selecting, from the correspondence in accordance with channel measurement data acquired through measuring the downlink reference signal, one of the rank values as a target rank value, and determining a CSI-RS port set corresponding to the target rank value as the target CSI-RS port set.

In the above mode, the terminal may determine the CSI-RS port set for the CSI measurement at the plurality of transmission nodes in accordance with the correspondence between the CSI-RS port sets configured by the network side device and different rank values supported by the transmission nodes.

In addition, in a possible embodiment of the present disclosure, in S120, the measuring the downlink reference signal for the plurality of transmission nodes in accordance with the plurality of measurement resources to determine the target CSI-RS port set for the CSI measurement of the transmission nodes includes: determining, by the terminal in accordance with the channel measurement data acquired through measuring the downlink reference signal, that CSI-RS ports corresponding to at least a part of the plurality of measurement resources in the resource set form the target CSI-RS port set.

In the embodiments of the present disclosure, in S110 of acquiring the resource set configured by the network side device, the resource set configured by the network side device may be in two forms.

In a first configuration form, the network side device may configure a plurality of resource sets for the terminal, and each resource set may include at least one measurement resource;

in the first configuration form, each resource set may correspond to one transmission node; and different measurement resources in the resource set may use different beams.

In a second configuration form, the network side device may configure one resource set for the terminal, and each resource set includes a plurality of measurement resources;

in the second configuration form, each measurement resource may correspond to one transmission node.

It should be appreciated that, in the embodiments of the present disclosure, the plurality of transmission nodes may include TRPs or panels.

Based on the above-mentioned configuration forms of the resource set, in a possible embodiment of the present disclosure, when the terminal determines the CSI-RS port set for the CSI measurement at the plurality of transmission nodes in accordance with the correspondence between the CSI-RS port sets configured by the network side device and different rank values supported by the transmission nodes, the correspondence between the CSI-RS port sets configured by the network side device and different rank values supported by the transmission nodes may be in the following forms.

In a first form, there is a plurality of resource sets, each of the resource sets includes at least one measurement resource, the measurement resources in the plurality of resource sets form a plurality of measurement resource combinations, and the measurement resources in each of the measurement resource combinations are located in different resource sets;

wherein in the acquired correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one of the measurement resource combinations.

In the first form, the network side device may select the resources in different resource sets to form a measurement resource combination. For each measurement resource combination, the network side device may notify the terminal of a CSI-RS port set corresponding to each rank value. For example:

a CSI-RS port may be $P_0^{(1)}$ in the case of rank-1, and it may correspond to a certain resource in a certain resource set;

CSI-RS ports may be $P_0^{(2)}$ and $P_1^{(2)}$ in the case of rank-2, and they may be selected from a port set corresponding to a certain measurement resource combination;

CSI-RS ports may be $P_0^{(3)}$, $P_1^{(3)}$ and $P_2^{(3)}$ in the case of rank-3, and they may be selected from a port set corresponding to a certain measurement resource combination;

CSI-RS ports may be $P_0^{(4)}$, $P_1^{(4)}$, $P_2^{(4)}$ and $P_3^{(4)}$ in the case of rank-4, and they may be selected from a port set corresponding to a certain measurement resource combination;

CSI-RS ports may be $P_0^{(1)}$, ..., and $P_{R-1}^{(R)}$ in the case of rank-R, and they may be selected from a port set corresponding to a certain measurement resource combination.

In a second form, there is one resource set including a plurality of measurement resources, and at least a part of the plurality of measurement resources forms a measurement resource combination;

wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination. In the second form, for a combination of a plurality of measurement resources, a CSI-RS port set corresponding to each rank value may be notified. For example:

a CSI-RS port may be $P_0^{(1)}$ in the case of rank-1, and it may correspond to a certain resource;

CSI-RS ports may be $P_0^{(2)}$ and $P_1^{(2)}$ in the case of rank-2, and they may be selected from a port set corresponding to a plurality of resources;

CSI-RS ports may be $P_0^{(3)}$, $P_1^{(3)}$ and $P_2^{(3)}$ in the case of rank-3, and they may be selected from a port set corresponding to a plurality of resources;

CSI-RS ports may be $P_0^{(4)}$, $P_1^{(4)}$, $P_2^{(4)}$ and $P_3^{(4)}$ in the case of rank-4, and they may be selected from a port set corresponding to a plurality of resources;

. . .

CSI-RS ports may be $P_0^{(1)}$, . . . , and $P_{R-1}^{(R)}$ in the case of rank-R, and they may be selected from a port set corresponding to a plurality of resources.

In a third form, there is a plurality of resource sets and each of the resource sets includes at least one measurement resource; or there is one resource set including a plurality of measurement resources;

wherein in the correspondences, one measurement resource corresponds to one correspondence; and in the correspondences, each of different rank values corresponds to a respective one of the CSI-RS port sets, and each of the CSI-RS ports in the CSI-RS port set belongs to a port corresponding to a same measurement resource.

In the third form, no matter whether the quantity of the resource sets configured by the network side device for the terminal is plural or one, with respect to each measurement resource, the network side device may notify the terminal of the CSI-RS port set corresponding to each rank value. For example:

a CSI-RS port may be $P_0^{(1)}$ in the case of rank-1;

CSI-RS ports may be $P_0^{(2)}$ and $P_1^{(2)}$ in the case of rank-2;

CSI-RS ports may be $P_0^{(3)}$, $P_1^{(3)}$ and $P_2^{(3)}$ in the case of rank-3;

CSI-RS ports may be $P_0^{(4)}$, $P_1^{(4)}$, $P_2^{(4)}$ and $P_3^{(4)}$ in the case of rank-4;

. . .

CSI-RS ports may be $P_0^{(1)}$, . . . , and $P_{R-1}^{(R)}$ in the case of rank-R.

Based on the correspondence between the CSI-RS port set acquired from the network side device and different rank values supported by the transmission nodes, in the embodiments of the present disclosure, based on the resource set including the plurality of measurement resources configured by the network side device for the terminal and the correspondence between the CSI-RS port set and different rank values supported by the transmission nodes, the terminal may measure the downlink reference signal for the plurality of transmission nodes, determine the target CSI-RS port set for the CSI measurement, and perform calculation to acquire the to-be-reported CSI in accordance with the target CSI-RS port set.

To be specific, when the correspondence between the CSI-RS port sets configured by the network side device and different rank values supported by the transmission nodes is in the first form, the selecting, by the terminal, one rank value from the correspondence as the target rank value may include:

selecting, from the correspondence corresponding to one measurement resource combination, one rank value as the target rank value.

Further, in S130, the performing calculation to acquire the to-be-reported CSI in accordance with the CSI-RS port set may include calculating CSI for each codeword in accordance with a CSI-RS port set corresponding to a target rank value;

wherein the acquired CSI may include a CQI.

In the above mode, the terminal may determine that the target rank value rank=RI recommended by the terminal in accordance with the measurement on the downlink reference signal as well as the CSI-RS port sets $p_0^{(1)}$, $p_0^{(2)}$, $p_1^{(2)}$, $p_0^{(3)}$, $p_1^{(3)}$, $p_2^{(3)}$, . . . , $p_0^{(R)}$, $P_1^{(R)}$, . . . , $p_{R-1}^{(R)}$ in the correspondence corresponding to each measurement resource combination configured by the network side device, and determine CSI-RS port sets $P_0^{(1)}$, . . . , $P_{RI-1}^{(RI)}$ corresponding to the target rank value rank=RI.

Further, the CQI for each codeword may be calculated in accordance with the CSI-RS port sets $P_0^{(1)}$, . . . , $P_{RI-1}^{(RI)}$.

In the embodiments of the present disclosure, subsequent to calculating the CSI for each codeword, the CSI reporting method may further include reporting the CQI for each codeword and the target rank value.

To be specific, when the correspondence between the CSI-RS port sets configured by the network side device and different rank values supported by the transmission nodes is in the second form, selecting, by the terminal from the correspondence one of the rank values as the target rank value includes:

selecting, from the correspondence corresponding to one measurement resource combination, one rank value as the target rank value.

Further, in S130, the performing calculation to acquire the to-be-reported CSI in accordance with the target CSI-RS port set may include:

calculating CSI for each codeword in accordance with a CSI-RS port set corresponding to a target rank value;

wherein the calculated CSI may include a CQI.

In the above mode, the terminal may determine the target rank value rank=RI recommended by the terminal in accordance with the measurement on the downlink reference signal as well as the CSI-RS port sets $p_0^{(1)}$, $p_0^{(2)}$, $p_1^{(2)}$, $p_0^{(3)}$, $p_1^{(3)}$, $p_2^{(3)}$, . . . , $p_0^{(R)}$, $P_1^{(R)}$, . . . , $p_{R-1}^{(R)}$ in the correspondence corresponding to each measurement resource combination configured by the network side device, and determine CSI-RS port sets $P_0^{(1)}$, . . . , $P_{RI-1}^{(RI)}$ corresponding to the target rank value rank=RI.

Further, the CQI for each codeword may be calculated in accordance with the CSI-RS port sets $P_0^{(1)}$, . . . , $P_{RI-1}^{(RI)}$.

In the embodiments of the present disclosure, subsequent to calculating the CSI for each codeword, the CSI reporting method may further include:

reporting the CQI for each codeword and the target rank value.

In a possible embodiment of the CSI reporting method of the present disclosure, when the correspondence between the CSI-RS port sets configured by the network side device and different rank values supported by the transmission nodes is in the third form and there is a plurality of resource sets, the selecting, by the terminal from the correspondence one of the rank values as the target rank value includes:

determining at least one target measurement resource in each of the resource sets;

selecting, from the correspondence corresponding to each target measurement resource, a respective one rank value as the target rank value.

In the above mode, the terminal may determine at least one target measurement resource recommended by the terminal from each resource set in accordance with the measurement on the downlink reference signal as well as the correspondences $p_0^{(1)}, p_0^{(2)}, p_1^{(2)}, p_0^{(3)}, p_1^{(3)}, p_2^{(3)}, \ldots, p_0^{(R)}, P_1^{(R)}, \ldots, p_{R-1}^{(R)}$ corresponding measurement resource configured by the network side device, determine a rank value capable being recommended, i.e., the target rank value rank=RI in accordance with the correspondence corresponding to the target measurement resource, and determine the CSI-RS port set $P_0^{(1)}, \ldots, P_{RI-1}^{(RI)}$ corresponding to the target rank value rank=RI in accordance with the correspondence.

Further, in S130, the performing calculation to acquire the to-be-reported CSI in accordance with the target CSI-RS port set may include calculating CSI for each codeword in accordance with the CSI-RS port set $P_0^{(1)}, \ldots, P_{RI-1}^{(RI)}$ corresponding to the target rank value determined for each target measurement resource.

In a possible embodiment of the present disclosure, the calculated CSI may include a CQI.

In the embodiments of the present disclosure, subsequent to calculating the CSI for each codeword, the CSI reporting method may further include:

reporting the target rank value corresponding to each target measurement resource and the CQI for each codeword.

The CSI reporting method may further include:

reporting an identifier of the target measurement resource (e.g., CRI) and/or an identifier of the resource set to which the target measurement resource belongs.

In a possible embodiment of the CSI reporting method of the present disclosure, when the correspondence between the CSI-RS port sets configured by the network side device and different rank values supported by the transmission nodes is in the third form and there is one resource set, the selecting, by the terminal from the correspondence, one of the rank values as the target rank value includes:

determining at least one measurement resource in the plurality of measurement resources as a target measurement resource;

determining, from the correspondence corresponding to the target measurement resource, one rank value as the target rank value.

In the above mode, the terminal may determine at least one target measurement resource capable of being recommended by the terminal from the measurement resources as the target measurement resource in accordance with the measurement on the downlink reference signal as well as the correspondences $p_0^{(1)}, p_0^{(2)}, p_1^{(2)}, p_0^{(3)}, p_1^{(3)}, p_2^{(3)}, \ldots, p_0^{(R)}, P_1^{(R)}, \ldots, p_{R-1}^{(R)}$ corresponding to each measurement resource configured by the network side device, determine a rank value capable being recommended, i.e., the target rank value rank=RI in accordance with the correspondence corresponding to each target measurement resource, and determine the CSI-RS port set $P_0^{(1)}, \ldots, P_{RI-1}^{(RI)}$ corresponding to the target rank value rank=RI in accordance with the correspondence.

Further, in S130, the performing calculation to acquire the to-be-reported CSI in accordance with the target CSI-RS port set may include: calculating CSI for each codeword in accordance with the CSI-RS port set $P_0^{(1)}, \ldots, P_{RI-1}^{(RI)}$ corresponding to the target rank value determined for each target measurement resource.

In a possible embodiment of the present disclosure, the calculated CSI may include a CQI.

In the embodiments of the present disclosure, subsequent to calculating the CSI for each codeword, the CSI reporting method may further include reporting the target rank value corresponding to each target measurement resource and the CQI for each codeword.

The CSI reporting method may further include:

reporting an identifier of the target measurement resource (e.g., CRI).

In a possible embodiment of the CSI reporting method of the present disclosure, in S120, the terminal may determine, by itself, that the CSI-RS ports corresponding to at least a part of the measurement resources in the resource set form the target CSI-RS port set in accordance with the plurality of measurement resources configured by the network side device as well as the channel measurement data acquired through measuring the downlink reference signal.

To be specific, in a possible embodiment of the present disclosure, when there is a plurality of resource sets, the determining, by the terminal, that the CSI-RS ports corresponding to at least a part of the measurement resources in the resource set form the target CSI-RS port set in accordance with the channel measurement data acquired through measuring the downlink reference signal may include:

determining a target measurement resource in each resource set and a CSI-RS port set corresponding to the target measurement resource in accordance with the channel measurement data;

determining a CSI-RS port set corresponding to the measurement resource as the target CSI-RS port set.

In the above-mentioned mode, the terminal may determine its recommended resources in each resource set, i.e., the target measurement resources, in accordance with the measurement on the downlink reference signal, and determine the port set recommended with respect to the resource, i.e., the corresponding CSI-RS port set.

Further, in S130, the performing calculation to acquire the to-be-reported CSI in accordance with the target CSI-RS port set may include: calculating the CQI for each codeword in accordance with the determined target CSI-RS port set, i.e., calculating the CQI for each codeword in accordance with the port set corresponding to each recommended resource.

Subsequent to calculating the CQI for each codeword, the CSI reporting method may further include:

reporting the target CSI-RS port set and the CQI for each codeword.

In a possible embodiment of the present disclosure, CSI reporting method may further include:

reporting an identifier of the target measurement resource and/or an identifier of the resource set to which the target measurement resource belongs.

In another possible embodiment of the present disclosure, when there is one resource set, the determining, by the terminal, that the CSI-RS ports corresponding to at least a part of the measurement resources in the resource set form the target CSI-RS port set in accordance with the channel measurement data acquired through measuring the downlink reference signal may include:

determining a target measurement resource in the plurality of measurement resources in the resource set and a CSI-RS port set corresponding to the target measurement resource in accordance with the channel measurement data;

determining the CSI-RS port set corresponding to the target measurement resource as the target CSI-RS port set.

In the above-mentioned mode, the terminal may determine the target measurement resource in the plurality of measurement resources as the recommended measurement resource in accordance with the measurement on the downlink reference signal, and determine a corresponding port set as the target CSI-RS port set.

Further, in S130, the performing calculation to acquire the to-be-reported CSI in accordance with the target CSI-RS port set may include:

calculating a CQI for each codeword in accordance with the target CSI-RS port set corresponding to each determined target measurement resource, i.e., calculating the CQI for each codeword with respect to the port set corresponding to each recommended resource.

Subsequent to calculating the CQI for each codeword, the CSI reporting method may further include:

reporting the target CSI-RS port set and the CQI for each codeword.

In a possible embodiment of the present disclosure, the CSI reporting method may further include:

reporting an identifier of the target measurement resource.

According to the CSI reporting method in the embodiments of the present disclosure, through the resource set including a plurality of measurement resources configured by the network side device, it is able to measure the downlink reference signal for the plurality of incoherent transmission nodes, so as to determine the CSI-RS port sets for the CSI measurement corresponding to the plurality of incoherent transmission nodes, thereby to calculate the CQI for each codeword with respect to each incoherent transmission node.

Figure 2:
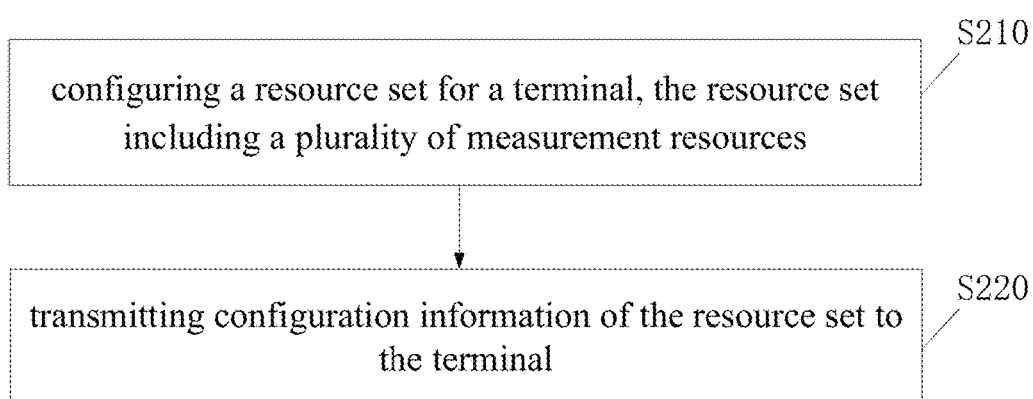
FIG. 2 is a flow chart of a second implementation of CSI reporting method according to an embodiment of the present disclosure.

The present disclosure further provides in some embodiments a CSI reporting method for a network side device which, as shown in FIG. 2, includes:

S210 of configuring a resource set for a terminal, the resource set including a plurality of measurement resources;

S220 of transmitting configuration information of the resource set to the terminal.

In a possible embodiment of the present disclosure, the CSI reporting method may further include:

configuring a correspondence between CSI-RS port sets and different rank values supported by the transmission nodes in accordance with the plurality of measurement resources;

transmitting the correspondence to the terminal.

In a possible embodiment of the present disclosure, in S210, there may exist a plurality of configured resource sets and each resource set may include at least one measurement resource, or there may exist one resource set including a plurality of measurement resources.

In a possible embodiment of the present disclosure, in a first implementation mode, the correspondence may be configured by the network side device as follows:

there may exist a plurality of resource sets, each resource set may include at least one measurement resource, the measurement resources in the plurality of resource sets may form a plurality of measurement resource combinations, and the measurement resources in each measurement resource combination may be located in different resource sets;

in the correspondence, one measurement resource combination may correspond to one correspondence. In each correspondence, different rank values may correspond to the CSI-RS port sets respectively, and the CSI-RS ports in the CSI-RS port set belong to at least a part of ports in a port set corresponding to one measurement resource combination.

In a possible embodiment of the present disclosure, in a second implementation mode, the correspondence may be configured by the network side device as follows:

there may exist one resource set including a plurality of measurement resources, and at least a part of the plurality of measurement resources may form measurement resource combinations;

in the correspondence, one measurement resource combination may correspond to one correspondence. In each correspondence, different rank values may correspond to the CSI-RS port sets respectively, and the CSI-RS ports in the CSI-RS port set belong to at least a part of ports in a port set corresponding to one measurement resource combination.

In a possible embodiment of the present disclosure, in a third implementation mode, the correspondence may be configured by the network side device as follows:

there may exist a plurality of resource sets and each resource set may include at least one measurement resource; or there may exist one resource set including a plurality of measurement resources;

in the correspondence, one measurement resource may correspond to one correspondence; and in the correspondence, different rank values may correspond to the CSI-RS port sets respectively, and each CSI-RS port in the CSI-RS port set may belong to a port corresponding to a same measurement resource.

It should be appreciated that, in the embodiments of the present disclosure, the network side device may further acquire CSI from the terminal to each transmission node in the following modes.

1) Reciprocity-Based Acquisition Mode

The terminal may transmit an uplink reference signal (e.g., a Sounding Reference Signal (SRS));

a base station may measure the uplink reference signal and estimate channel information from the terminal to each TRP or panel.

b) Codebook-based feedback mode

The terminal may measure a downlink reference signal (e.g., a CSI-RS), and transmit a feedback to the network side device on the basis of a codebook (e.g., reported information may include such parameters as PMI/RI).

Further, the network side device may calculate a precoding matrix for each TRP or panel participating in the CSI measurement in the following modes.

1) Interferences between codewords/layers from different TRPs or panels may be taken into consideration and optimized (similar to Multiple User-MIMO (MU-MIMO));

based on this mode, it is necessary to collect CSI about a plurality of TRPs or panels, and then perform the calculation uniformly.

2) The precoding matrix may be calculated with respect to each individual TRP or panel. Based on this mode, an X2 interface is less demanded, and it is unnecessary to collect the CSI about the plurality of TRPs or panels and the uniform calculation.

According to the CSI reporting method in the embodiments of the present disclosure, the network side device may configure for the terminal the resource set including the plurality of measurement resources as well as the correspondence between the CSI-RS port sets of measurement resource configurations and different rank values supported by the transmission nodes. As a result, it is able for the terminal to measure the CSI-RS and calculate a corresponding CQI, thereby to report the CSI in a radio network during the multiple-point incoherent transmission.

Figure 3:
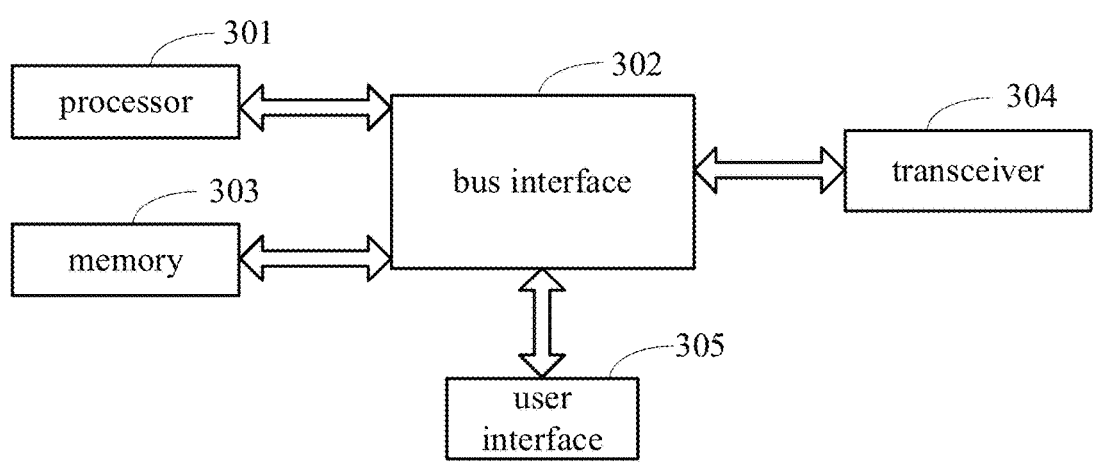
FIG. 3 is a structure schematic view showing a terminal according to an embodiment of the present disclosure.

The present disclosure further provides in some embodiments a terminal which, as shown in FIG. 3, includes a processor 301, and a memory 303 connected to the processor 301 via a bus interface 302 and storing therein programs and data for the operation of the processor 301. The processor 301 is configured to call and execute the programs and data in the memory 303.

A transceiver 304 may be connected to the bus interface 302 and configured to receive and transmit data under the control of the processor 301. To be specific, the processor 301 is configured to read the programs in the memory 303, so as to:

acquire a resource set configured by a network side device, the resource set including a plurality of measurement resources;

measure a downlink reference signal for a plurality of transmission nodes in accordance with the plurality of measurement resources, to determine a target CSI-RS port set for CSI measurement; and perform calculation in accordance with the target CSI-RS port set to acquire to-be-reported CSI.

In a possible embodiment of the present disclosure, the processor 301 is further configured to:

acquire a correspondence between CSI-RS port sets and different rank values supported by the transmission nodes, the correspondence being configured by the network device in accordance with the plurality of measurement resources;

wherein the measuring the downlink reference signal for the plurality of transmission nodes in accordance with the plurality of measurement resources to determine the target CSI-RS port set for the CSI measurement includes: selecting, from the correspondence in accordance with channel measurement data acquired through measuring the downlink reference signal, one of the rank values as a target rank value, and determining a CSI-RS port set corresponding to the target rank value as the target CSI-RS port set.

In a possible embodiment of the present disclosure, when the processor 301 measures the downlink reference signal for the plurality of transmission nodes in accordance with the plurality of measurement resources to determine the target CSI-RS port set for the CSI measurement, the terminal is configured to determine, in accordance with the channel measurement data acquired through measuring the downlink reference signal, that CSI-RS ports corresponding to at least a part of the plurality of measurement resources form the target CSI-RS port set.

In a possible embodiment of the present disclosure, there is a plurality of resource sets and each of the resource sets includes at least one measurement resource, or there is one resource set including a plurality of measurement resources.

In a possible embodiment of the present disclosure, there is a plurality of resource sets, each of the resource sets includes at least one measurement resource, the measurement resources in the plurality of resource sets form a plurality of measurement resource combinations, and the measurement resources in each of the measurement resource combinations are located in different resource sets;

wherein in the acquired correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one of the measurement resource combinations.

In a possible embodiment of the present disclosure, there is one resource set including a plurality of measurement resources, and at least a part of the plurality of measurement resources forms a measurement resource combination;

wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination.

In a possible embodiment of the present disclosure, there is a plurality of resource sets and each of the resource sets includes at least one measurement resource; or there is one resource set including a plurality of measurement resources;

wherein in the correspondences, one measurement resource corresponds to one correspondence; and in the correspondences, each of different rank values corresponds to a respective one of the CSI-RS port sets, and each of the CSI-RS ports in the CSI-RS port set belongs to a port corresponding to a same measurement resource.

In a possible embodiment of the present disclosure, when selecting from the correspondence one of the rank values as the target rank value, the processor 301 is further configured to select, from the correspondence corresponding to one measurement resource combination, one rank value as the target rank value.

In a possible embodiment of the present disclosure, when there is a plurality of resource sets and when selecting from the correspondence one of the rank values as the target rank value, the processor 301 is further configured to:

determine at least one target measurement resource in each of the resource sets;

select, from the correspondence corresponding to each target measurement resource, a respective one rank value as the target rank value.

In a possible embodiment of the present disclosure, when there is one resource set and when selecting from the correspondence one of the rank values as the target rank value, the processor 301 is further configured to:

determine at least one measurement resource in the plurality of measurement resources as a target measurement resource;

determine, from the correspondence corresponding to the target measurement resource, one rank value as the target rank value.

In a possible embodiment of the present disclosure, in the step that the processor 301 performs calculation to acquire the to-be-reported CSI, the CSI includes a CQI;

wherein the processor 301 is further configured to:

report the CQI for each codeword and the target rank value.

In a possible embodiment of the present disclosure, in the step that the processor 301 performs calculation to acquire the to-be-reported CSI, the CSI includes a CQI;

wherein the processor 301 is further configured to:

report the target rank value corresponding to each target measurement resource and the CQI for each codeword.

In a possible embodiment of the present disclosure, the processor 301 is further configured to:

report an identifier of the target measurement resource and/or an identifier of the resource set to which the target measurement resource belongs.

In a possible embodiment of the present disclosure, in the step that the processor 301 performs calculation to acquire the to-be-reported CSI, the CSI includes a CQI;

wherein the processor 301 is further configured to:

report the target rank value corresponding to each target measurement resource and the CQI for each codeword.

In a possible embodiment of the present disclosure, the processor 301 is further configured to:

report an identifier of the target measurement resource.

In a possible embodiment of the present disclosure, when there is a plurality of resource sets, and when determining, in accordance with the channel measurement data acquired through measuring the downlink reference signal, that CSI-RS ports corresponding to at least a part of the measurement resources in the resource set form the target CSI-RS port set, the terminal is further configured to:

determine a target measurement resource in each of the resource sets and a CSI-RS port set corresponding to the target measurement resource in accordance with the channel measurement data;

determine a CSI-RS port set corresponding to the measurement resource as the target CSI-RS port set.

In a possible embodiment of the present disclosure, when the processor 301 performs calculation to acquire the to-be-reported CSI, the CSI includes a CQI;

wherein the processor 301 is further configured to:

report the target CSI-RS port set and the CQI for each codeword.

In a possible embodiment of the present disclosure, the processor 301 is further configured to:

report an identifier of the target measurement resource and/or an identifier of the resource set to which the target measurement resource belongs.

In a possible embodiment of the present disclosure, when there is one resource set, and when determining, in accordance with the channel measurement data acquired through measuring the downlink reference signal, that CSI-RS ports corresponding to at least a part of the measurement resources in the resource set form the target CSI-RS port set, the terminal is further configured to:

determine a target measurement resource in the plurality of measurement resources in the resource set and a CSI-RS port set corresponding to the target measurement resource in accordance with the channel measurement data;

determine the CSI-RS port set corresponding to the target measurement resource as the target CSI-RS port set.

In a possible embodiment of the present disclosure, in the step that the processor 301 performs calculation to acquire the to-be-reported CSI, the CSI includes a CQI;

wherein the processor 301 is further configured to:

report the target CSI-RS port set and the CQI for each codeword.

In a possible embodiment of the present disclosure, the processor 301 is further configured to:

report the identifier of the target measurement resource.

It should be appreciated that, in FIG. 3, a bus architecture may include a number of buses and bridges connected to each other, so as to connect various circuits for one or more processors represented by the processor 301 and one or more memories represented by the memory 303. In addition, as is known in the art, the bus architecture may be used to connect various other circuits, such as a circuit for a peripheral device, a circuit for a voltage stabilizer and a power management circuit, which will not be further defined herein. The bus interface may be provided, and the transceiver 304 may consist of a plurality of elements, i.e., a transmitter and a receiver for communication with various other devices over a transmission medium. With respect to different terminals, a user interface 305 may also be provided for devices which are to be arranged inside or outside the terminal, and these devices may include but not limited to a keypad, a display, a speaker, a microphone and a joystick.

The processor 301 may take charge of managing the bus architecture as well as general processings. The memory 303 may store therein data for the operation of the processor 301.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form.

Figure 4:
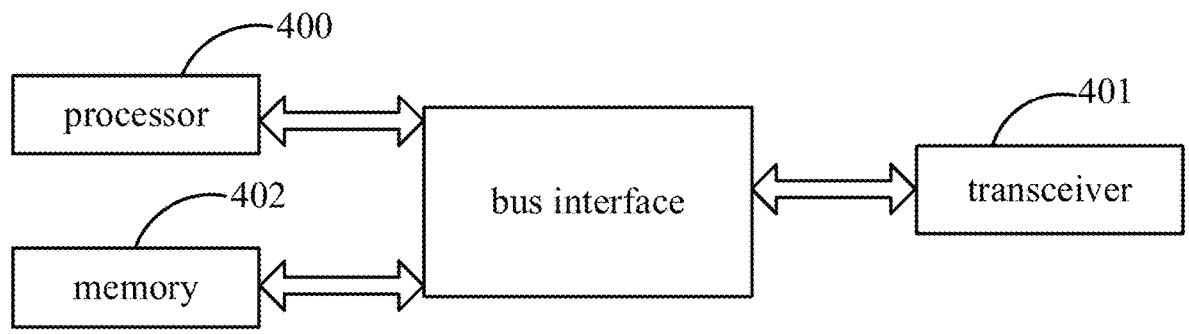
FIG. 4 is a structure schematic view showing a network side device according to an embodiment of the present disclosure.

As shown in FIG. 4, the present disclosure further provides in some embodiments a network side device, which includes a transceiver 401, a memory 402, a processor 400, and a computer program stored in the memory 402 and executed by the processor 400. The processor 400 is configured to call and execute programs and data stored in the memory 402.

The transceiver 401 is configured to receive and transmit data under the control of the processor 400. To be specific, the processor 400 is configured to read the programs in the memory 402, so as to:

configure a resource set for a terminal, the resource set including a plurality of measurement resources;

transmit configuration information of the resource set to the terminal.

In a possible embodiment of the present disclosure, the processor 400 is further configured to:

configure a correspondence between CSI-RS port sets and different rank values supported by a transmission node in accordance with the plurality of measurement resources;

transmit the correspondence to the terminal.

In a possible embodiment of the present disclosure, there is a plurality of resource sets and each of the resource sets includes at least one measurement resource; or there is one resource set including a plurality of measurement resources.

In a possible embodiment of the present disclosure, there is a plurality of resource sets, each of the resource sets includes at least one measurement resource, the measurement resources in the plurality of resource sets form a plurality of measurement resource combinations, and the measurement resources in each of the measurement resource combinations are located in different resource sets;

wherein in the correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one measurement resource combination.

In a possible embodiment of the present disclosure, there is one resource set including a plurality of measurement resources, and at least a part of the plurality of measurement resources forms a measurement resource combination;

wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination.

In a possible embodiment of the present disclosure, there is a plurality of resource sets and each of the resource sets includes at least one measurement resource; or there is one resource set including a plurality of measurement resources;

wherein in the correspondences, one measurement resource corresponds to one correspondence; and in the correspondences, each of different rank values corresponds to a respective one of the CSI-RS port sets, and each of the CSI-RS ports in the CSI-RS port set belongs to a port corresponding to one measurement resource.

In FIG. 4, a bus architecture may include a number of buses and bridges connected to each other, so as to connect various circuits for one or more processors represented by the processor 400 and one or more memories represented by the memory 402. In addition, as is known in the art, the bus architecture may be used to connect various other circuits, such as a circuit for a peripheral device, a circuit for a voltage stabilizer and a power management circuit, which will not be further defined herein. The bus interface may be provided, and the transceiver 401 may consist of a plurality of elements, i.e., a transmitter and a receiver for communication with various other devices over a transmission medium. The processor 400 may take charge of managing the bus architecture as well as general processings. The memory 402 may store therein data for the operation of the processor 400.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form.

Figure 5:
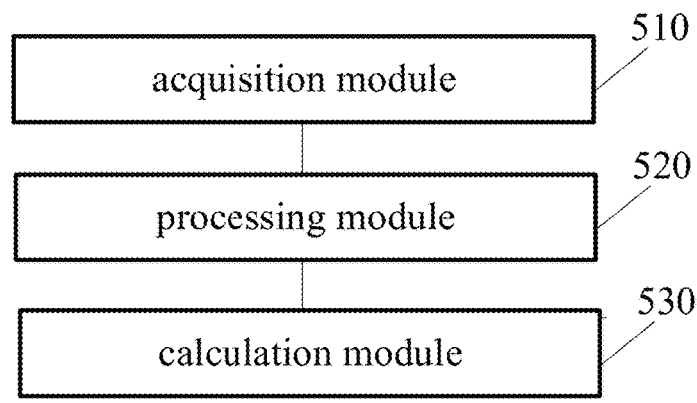
FIG. 5 is a structure schematic view showing a CSI reporting device according to an embodiment of the present disclosure.

The present disclosure further provides in some embodiments a CSI reporting device for a terminal which, as shown in FIG. 5, includes:

an acquisition module 510 configured to acquire a resource set configured by a network side device, the resource set including a plurality of measurement resources;

a processing module 520 configured to measure a downlink reference signal for a plurality of transmission nodes in accordance with the plurality of measurement resources, to determine a target CSI-RS port set for CSI measurement;

a calculation module 530 configured to perform calculation in accordance with the target CSI-RS port set to acquire to-be-reported CSI.

In a possible embodiment of the present disclosure, the acquisition module 501 is further configured to:

acquire a correspondence between CSI-RS port sets and different rank values supported by the transmission nodes, the correspondence being configured by the network side device in accordance with the plurality of measurement resources;

wherein the measuring the downlink reference signal for the plurality of transmission nodes in accordance with the plurality of measurement resources to determine the target CSI-RS port set for the CSI measurement includes: selecting, from the correspondence in accordance with channel measurement data acquired through measuring the downlink reference signal, one of the rank values as a target rank value, and determining a CSI-RS port set corresponding to the target rank value as the target CSI-RS port set.

In a possible embodiment of the present disclosure, when measuring the downlink reference signal for the plurality of transmission nodes in accordance with the plurality of measurement resources to determine the target CSI-RS port set for the CSI measurement, the processing module 520 is further configured to determine, in accordance with the channel measurement data acquired through measuring the downlink reference signal, that CSI-RS ports corresponding to at least a part of the plurality of measurement resources form the target CSI-RS port set.

In a possible embodiment of the present disclosure, there is a plurality of resource sets and each of the resource sets includes at least one measurement resource, or there is one resource set including a plurality of measurement resources.

In a possible embodiment of the present disclosure, there is a plurality of resource sets, each of the resource sets includes at least one measurement resource, the measurement resources in the plurality of resource sets form a plurality of measurement resource combinations, and the measurement resources in each of the measurement resource combinations are located in different resource sets;

wherein in the acquired correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one of the measurement resource combinations.

In a possible embodiment of the present disclosure, there is one resource set including a plurality of measurement resources, and at least a part of the plurality of measurement resources forms a measurement resource combination;

wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination.

In a possible embodiment of the present disclosure, there is a plurality of resource sets and each of the resource sets includes at least one measurement resource; or there is one resource set including a plurality of measurement resources;

wherein in the correspondences, one measurement resource corresponds to one correspondence; and in the correspondences, each of different rank values corresponds to a respective one of the CSI-RS port sets, and each of the CSI-RS ports in the CSI-RS port set belongs to a port corresponding to a same measurement resource.

In a possible embodiment of the present disclosure, when selecting from the correspondence one of the rank values as the target rank value, the processing module 520 is further configured to select, from the correspondence corresponding to one measurement resource combination, one rank value as the target rank value.

In a possible embodiment of the present disclosure, when there is a plurality of resource sets and when selecting from the correspondence one of the rank values as the target rank value, the processing module 520 is further configured to:

determine at least one target measurement resource in each of the resource sets;

select, from the correspondence corresponding to each target measurement resource, a respective one rank value as the target rank value.

In a possible embodiment of the present disclosure, when there is one resource set and when selecting from the correspondence one of the rank values as the target rank value, the processing module 520 is further configured to:

determine at least one measurement resource in the plurality of measurement resources as a target measurement resource;

determine, from the correspondence corresponding to the target measurement resource, one rank value as the target rank value.

In a possible embodiment of the present disclosure, in the step that the calculation module 530 performs calculation to acquire the to-be-reported CSI, the CSI includes a CQI;

wherein the calculation module 530 is further configured to: report the CQI for each codeword and the target rank value.

In a possible embodiment of the present disclosure, in the step that the calculation module 530 performs calculation to acquire the to-be-reported CSI, the CSI includes a CQI;

wherein the calculation module 530 is further configured to:

report the target rank value corresponding to each target measurement resource and the CQI for each codeword.

In a possible embodiment of the present disclosure, the calculation module 530 is further configured to:

report an identifier of the target measurement resource and/or an identifier of the resource set to which the target measurement resource belongs.

In a possible embodiment of the present disclosure, in the step that the calculation module 530 performs calculation to acquire the to-be-reported CSI, the CSI includes a CQI;

wherein the calculation module 530 is further configured to:

report the target rank value corresponding to each target measurement resource and the CQI for each codeword.

In a possible embodiment of the present disclosure, the calculation module 530 is further configured to:

report an identifier of the target measurement resource.

In a possible embodiment of the present disclosure, when there is a plurality of resource sets, and when determining, in accordance with the channel measurement data acquired through measuring the downlink reference signal, that CSI-RS ports corresponding to at least a part of the measurement resources in the resource set form the target CSI-RS port set, the processing module 520 is further configured to:

determine a target measurement resource in each of the resource sets and a CSI-RS port set corresponding to the target measurement resource in accordance with the channel measurement data;

determine a CSI-RS port set corresponding to the measurement resource as the target CSI-RS port set.

In a possible embodiment of the present disclosure, when the calculation module 530 performs calculation to acquire the to-be-reported CSI, the CSI includes a CQI;

wherein the calculation module 530 is further configured to:

report the target CSI-RS port set and the CQI for each codeword.

In a possible embodiment of the present disclosure, the calculation module 530 is further configured to:

report an identifier of the target measurement resource and/or an identifier of the resource set to which the target measurement resource belongs.

In a possible embodiment of the present disclosure, when there is one resource set, and when determining, in accordance with the channel measurement data acquired through measuring the downlink reference signal, that CSI-RS ports corresponding to at least a part of the measurement resources in the resource set form the target CSI-RS port set, the processing module 520 is further configured to:

determine a target measurement resource in the plurality of measurement resources in the resource set and a CSI-RS port set corresponding to the target measurement resource in accordance with the channel measurement data;

determine the CSI-RS port set corresponding to the target measurement resource as the target CSI-RS port set.

In a possible embodiment of the present disclosure, in the step that the calculation module 530 performs calculation to acquire the to-be-reported CSI, the CSI includes a CQI;

wherein the calculation module 530 is further configured to:

report the target CSI-RS port set and the CQI for each codeword.

In a possible embodiment of the present disclosure, the calculation module 530 is further configured to:

report the identifier of the target measurement resource.

Figure 6:
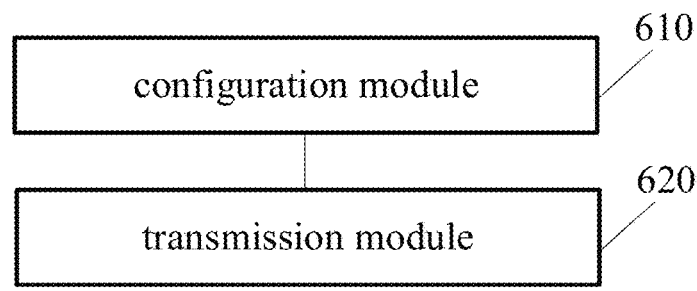
FIG. 6 is a structure schematic view showing a CSI reporting device according to an embodiment of the present disclosure.

The present disclosure further provides in some embodiments a CSI reporting device for a network side device which, as shown in FIG. 6, includes:

a configuration module 610 configured to configure a resource set for a terminal, the resource set including a plurality of measurement resources;

a transmission module 620 configured to transmit configuration information of the resource set to the terminal.

In a possible embodiment of the present disclosure, the configuration module 610 is further configured to:

configure a correspondence between CSI-RS port sets and different rank values supported by a transmission node in accordance with the plurality of measurement resources;

the transmission module 620 is further configured to transmit the correspondence to the terminal.

In a possible embodiment of the present disclosure, there is a plurality of resource sets and each of the resource sets includes at least one measurement resource; or there is one resource set including a plurality of measurement resources.

In a possible embodiment of the present disclosure, there is a plurality of resource sets, each of the resource sets includes at least one measurement resource, the measurement resources in the plurality of resource sets form a plurality of measurement resource combinations, and the measurement resources in each of the measurement resource combinations are located in different resource sets;

wherein in the correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one measurement resource combination.

In a possible embodiment of the present disclosure, there is one resource set including a plurality of measurement resources, and at least a part of the plurality of measurement resources forms a measurement resource combination;

wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination.

In a possible embodiment of the present disclosure, there is a plurality of resource sets and each of the resource sets includes at least one measurement resource; or there is one resource set including a plurality of measurement resources;

wherein in the correspondences, one measurement resource corresponds to one correspondence; and in the correspondences, each of different rank values corresponds to a respective one of the CSI-RS port sets, and each of the CSI-RS ports in the CSI-RS port set belongs to a port corresponding to one measurement resource.

The present disclosure further provides in some embodiments a computer-readable storage medium storing therein a computer program. The computer program is executed by a processor, so as to implement the steps of the above-mentioned CSI reporting method with a same technical effect, which will not be repeatedly defined herein. The computer-readable storage medium may be, e.g., a Read-Only Memory (ROM), a Random Access Memory (RAM), a magnetic disk or an optical disk.

It should be appreciated that, such words as "include" or "including" or any other variations involved in the present disclosure intend to provide non-exclusive coverage, so that a procedure, method, article or device including a series of elements may also include other elements not explicitly listed herein, or may include other inherent elements of the procedure, method, article or device. If without any further limitations, for the elements defined by such sentence as "including one . . . ", it is not excluded that the procedure, method, article or device including the elements may also include other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (e.g., mobile phone, computer, server, air conditioner or network device) to execute the method in the embodiments of the present disclosure.

The description has been given hereinabove in conjunction with the drawings and the embodiments, but the present disclosure shall not be limited to the above preferred embodiments. These embodiments are for illustrative purposes only, but shall not be used to limit the scope of the present disclosure. A person skilled in the art may make various modifications without departing from the principle of the present disclosure and the scope defined in the appended claims, which also fall within the scope of the present disclosure.

The above are optional implementations of the present disclosure. It should be appreciated that a person skilled in the art may make modifications and improvements without departing from the principles of the present disclosure. These modifications and improvements should also be regarded as being within the protection scope of the present disclosure.

What is claimed is:

1. A Channel State Information (CSI) reporting method for a terminal, comprising:
    acquiring a resource set configured by a network side device, the resource set comprising a plurality of measurement resources;
    measuring a downlink reference signal for a plurality of transmission nodes in accordance with the plurality of measurement resources, to determine a target Channel State Information-Reference Signal (CSI-RS) port set for CSI measurement; and
    performing calculation in accordance with the target CSI-RS port set to acquire to-be-reported CSI,
    wherein the CSI reporting method further comprising:
    acquiring a correspondence between CSI-RS port sets and different rank values supported by the transmission nodes, the correspondence being configured by the network side device in accordance with the plurality of measurement resources;
    wherein the measuring the downlink reference signal for the plurality of transmission nodes in accordance with the plurality of measurement resources to determine the target CSI-RS port set for the CSI measurement comprises: selecting, from the correspondence in accordance with channel measurement data acquired through measuring the downlink reference signal, one of the rank values as a target rank value, and determining a CSI-RS port set corresponding to the target rank value as the target CSI-RS port set.

2. The CSI reporting method according to claim 1, wherein the measuring the downlink reference signal for the plurality of transmission nodes in accordance with the plurality of measurement resources to determine the target CSI-RS port set for the CSI measurement comprises: determining, by the terminal in accordance with the channel measurement data acquired through measuring the downlink reference signal, that CSI-RS ports corresponding to at least a part of the plurality of measurement resources form the target CSI-RS port set.

3. The CSI reporting method according to claim 2, wherein when there is a plurality of resource sets, the determining, by the terminal in accordance with the channel measurement data acquired through measuring the downlink reference signal, that CSI-RS ports corresponding to at least a part of the measurement resources in the resource set form the target CSI-RS port set comprises:
    determining a target measurement resource in each of the resource sets and a CSI-RS port set corresponding to the target measurement resource in accordance with the channel measurement data;
    determining a CSI-RS port set corresponding to the measurement resource as the target CSI-RS port set.

4. The CSI reporting method according to claim 3, wherein in the step of performing calculation to acquire the to-be-reported CSI, the CSI comprises a CQI;
    wherein the CSI reporting method further comprises:
    reporting the target CSI-RS port set and the CQI for each codeword.

5. The CSI reporting method according to claim 1, wherein there is a plurality of resource sets and each of the resource sets comprises at least one measurement resource, or there is one resource set comprising a plurality of measurement resources.

6. The CSI reporting method according to claim 1, wherein there is a plurality of resource sets, each of the resource sets comprises at least one measurement resource, the measurement resources in the plurality of resource sets form a plurality of measurement resource combinations, and the measurement resources in each of the measurement resource combinations are located in different resource sets;
    wherein in the acquired correspondences, one of the measurement resource combinations corresponds to one of the correspondences, wherein in each of the correspondences, each of different rank values corresponds to a respective one of the CSI-RS port sets, and the CSI-RS ports in the CSI-RS port set belong to at least a part of ports in a port set corresponding to one of the measurement resource combinations.

7. The CSI reporting method according to claim 6, wherein the selecting from the correspondence one of the rank values as the target rank value comprises:

selecting, from the correspondence corresponding to one measurement resource combination, one rank value as the target rank value.

8. The CSI reporting method according to claim 7, wherein in the step of performing calculation to acquire the to-be-reported CSI, the CSI comprises a Channel Quality Indicator (CQI);
wherein the CSI reporting method further comprises:
reporting the CQI for each codeword and the target rank value.

9. The CSI reporting method according to claim 1, wherein there is one resource set comprising a plurality of measurement resources, and at least a part of the plurality of measurement resources forms a measurement resource combination;
wherein in the correspondences, one of the measurement resource combinations corresponds to one of the correspondences, wherein in each of the correspondences, each of different rank values corresponds to a respective one of the CSI-RS port set, and the CSI-RS ports in the CSI-RS port set belong to at least a part of ports in a port set corresponding to one measurement resource combination.

10. The CSI reporting method according to claim 1, wherein there is a plurality of resource sets and each of the resource sets comprises at least one measurement resource; or there is one resource set comprising a plurality of measurement resources;
wherein in the correspondences, one measurement resource corresponds to one correspondence; and
in the correspondences, each of different rank values corresponds to a respective one of the CSI-RS port sets, and each of the CSI-RS ports in the CSI-RS port set belongs to a port corresponding to a same measurement resource.

11. The CSI reporting method according to claim 10, wherein when there is a plurality of resource sets, the selecting from the correspondence one of the rank values as the target rank value comprises:
determining at least one target measurement resource in each of the resource sets;
selecting, from the correspondence corresponding to each target measurement resource, a respective one rank value as the target rank value.

12. The CSI reporting method according to claim 11, wherein in the step of performing calculation to acquire the to-be-reported CSI, the CSI comprises a CQI;
wherein the CSI reporting method further comprises:
reporting the target rank value corresponding to each target measurement resource and the CQI for each codeword.

13. The CSI reporting method according to claim 12, further comprising:
reporting an identifier of the target measurement resource and/or an identifier of the resource set to which the target measurement resource belongs.

14. The CSI reporting method according to claim 10, wherein when there is one resource set, the selecting from the correspondence one of the rank values as the target rank value comprises:
determining at least one measurement resource in the plurality of measurement resources as a target measurement resource;

determining, from the correspondence corresponding to the target measurement resource, one rank value as the target rank value.

15. The CSI reporting method according to claim 14, wherein in the step of performing calculation to acquire the to-be-reported CSI, the CSI comprises a CQI;
wherein the CSI reporting method further comprises:
reporting the target rank value corresponding to each target measurement resource and the CQI for each codeword.

16. The CSI reporting method according to claim 15, further comprising:
reporting an identifier of the target measurement resource.

17. A CSI reporting method for a network side device, comprising:
configuring a resource set for a terminal, the resource set comprising a plurality of measurement resources;
transmitting configuration information of the resource set to the terminal,
wherein the CSI reporting method further comprising:
configuring a correspondence between CSI-RS port sets and different rank values supported by a transmission node in accordance with the plurality of measurement resources;
transmitting the correspondence to the terminal.

18. A network side device, comprising a memory, a processor, and a program stored in the memory and capable of being executed by the processor, wherein the processor is configured to execute the program to implement the CSI reporting method according to claim 17.

19. A terminal, comprising a memory, a processor, and a program stored in the memory and executed by the processor, wherein the processor is configured to execute the program to:
acquire a resource set configured by a network side device, the resource set comprising a plurality of measurement resources;
measure a downlink reference signal for a plurality of transmission nodes in accordance with the plurality of measurement resources, to determine a target CSI-RS port set for CSI measurement; and
perform calculation in accordance with the target CSI-RS port set to acquire to-be-reported CSI,
wherein the processor is further configured to:
acquire a correspondence between CSI-RS port sets and different rank values supported by the transmission nodes, the correspondence being configured by the network device in accordance with the plurality of measurement resources;
wherein the measuring the downlink reference signal for the plurality of transmission nodes in accordance with the plurality of measurement resources to determine the target CSI-RS port set for the CSI measurement comprises: selecting, from the correspondence in accordance with channel measurement data acquired through measuring the downlink reference signal, one of the rank values as a target rank value, and determining a CSI-RS port set corresponding to the target rank value as the target CSI-RS port set.

* * * * *